United States Patent
Peresini et al.

(10) Patent No.: US 9,363,144 B1
(45) Date of Patent: Jun. 7, 2016

(54) INTERCONNECTING COMPUTERS IN A DATACENTER

(71) Applicant: Google Inc., Mountain View, CA (US)

(72) Inventors: Peter Peresini, Banska Bystrica (SK); Junlan Zhou, Sunnyvale, CA (US); Amin Vahdat, Los Altos, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/199,645

(22) Filed: Mar. 6, 2014

Related U.S. Application Data

(60) Provisional application No. 61/933,476, filed on Jan. 30, 2014.

(51) Int. Cl.
*H04Q 3/68* (2006.01)
*H04L 12/24* (2006.01)
*H04L 12/933* (2013.01)

(52) U.S. Cl.
CPC ............... *H04L 41/12* (2013.01); *H04L 49/15* (2013.01); *H04Q 3/68* (2013.01)

(58) Field of Classification Search
None
See application file for complete search history.

(56) References Cited

U.S. PATENT DOCUMENTS

| | | | |
|---|---|---|---|
| 5,020,052 A * | 5/1991 | DePrycker et al. | 370/232 |
| 5,734,486 A * | 3/1998 | Guillemot et al. | 398/54 |
| 7,630,877 B2 | 12/2009 | Brown et al. | |
| 2006/0095960 A1 | 5/2006 | Arregoces et al. | |
| 2009/0307334 A1 | 12/2009 | Maltz et al. | |
| 2012/0113870 A1 | 5/2012 | Chuang | |
| 2014/0043206 A1* | 2/2014 | Ahn et al. | 343/876 |

* cited by examiner

*Primary Examiner* — Omar Ghowrwal
(74) *Attorney, Agent, or Firm* — Edward A. Gordon; Foley & Lardner LLP

(57) ABSTRACT

Systems and methods of configuring a datacenter network are provided. A datacenter network can have a first stage of switches and a second stage of switches. A first stage of switches each including at least one first stage switch can be defined. A second stage of switches each including at least one second stage switch can be defined. For each first stage switch group of a first set of first stage switches, a communication link can be assigned between each first stage switch and each second stage switch in a respective second stage switch group. For each first stage switch group of a second set of first stage switches, a communication link can be assigned between each first stage switch and a single second stage switch of each second stage switch group.

17 Claims, 8 Drawing Sheets

INTERCONNECTING COMPUTERS IN A DATACENTER

RELATED APPLICATION

The present application claims the benefit of U.S. Provisional Patent Application No. 61/933,476 entitled "INTERCONNECTING COMPUTERS IN A DATACENTER," filed on Jan. 30, 2014, the disclosure of which is hereby incorporated by reference in its entirety for all purposes.

BACKGROUND

Cloud computing and its applications are effecting a qualitative shift in the way people communicate and share information. The underlying computer networks that support cloud computing can be divided into two major categories: intra-datacenter and inter-datacenter. Intra-datacenter networks interconnect the computing infrastructure (servers, disks) within the same building or among different buildings of a datacenter campus; inter-datacenter networks connect multiple datacenters distributed at different geographic locations. Many modern high-speed data links use optical transmission technologies via optical fibers for both intra- and inter-datacenter networks.

SUMMARY OF THE INVENTION

Aspects and implementations of the present disclosure are directed to systems and methods for interconnecting computers in a datacenter.

At least one aspect is directed to a method for configuring a datacenter network. The method can include defining first stage switch groups each including at least one first stage switch. The method can include defining second stage switch groups each including at least one second stage switch. For each first stage switch group of a first set of first stage switch groups, the method can include assigning a communication link between each first stage switch and each second stage switch in a respective second stage switch group. For each first stage switch group of a second set of first stage switch groups, the method can include assigning a communication link between each first stage switch and a single second stage switch of each second stage switch group.

At least one aspect is directed to a system. A first stage of switches and a second stage of switches. The system can include at least one first stage switch group, each first stage switch group comprising at least one first stage switch. The system can include at least one second stage switch group, each first stage switch group comprising at least one second stage switch. For each first stage switch group of a first set of first stage switch groups, the system can include a communication link formed between each first stage switch and each second stage switch in a respective second stage switch group. For each first stage switch group of a second set of first stage switch groups, the system can include a communication link formed between each first stage switch and a single second stage switch of each second stage switch group.

These and other aspects and embodiments are discussed in detail below. The foregoing information and the following detailed description include illustrative examples of various aspects and embodiments, and provide an overview or framework for understanding the nature and character of the claimed aspects and embodiments. The drawings provide illustration and a further understanding of the various aspects and embodiments, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing.

DESCRIPTION OF CERTAIN ILLUSTRATIVE IMPLEMENTATIONS

Following below are more detailed descriptions of various concepts related to, and implementations of, systems and methods for achieving improved datacenter performance and reliability. The various concepts introduced above and discussed in greater detail below may be implemented in any of numerous ways, as the described concepts are not limited to any particular manner of implementation. Examples of specific implementations and applications are provided primarily for illustrative purposes.

Figure 1:
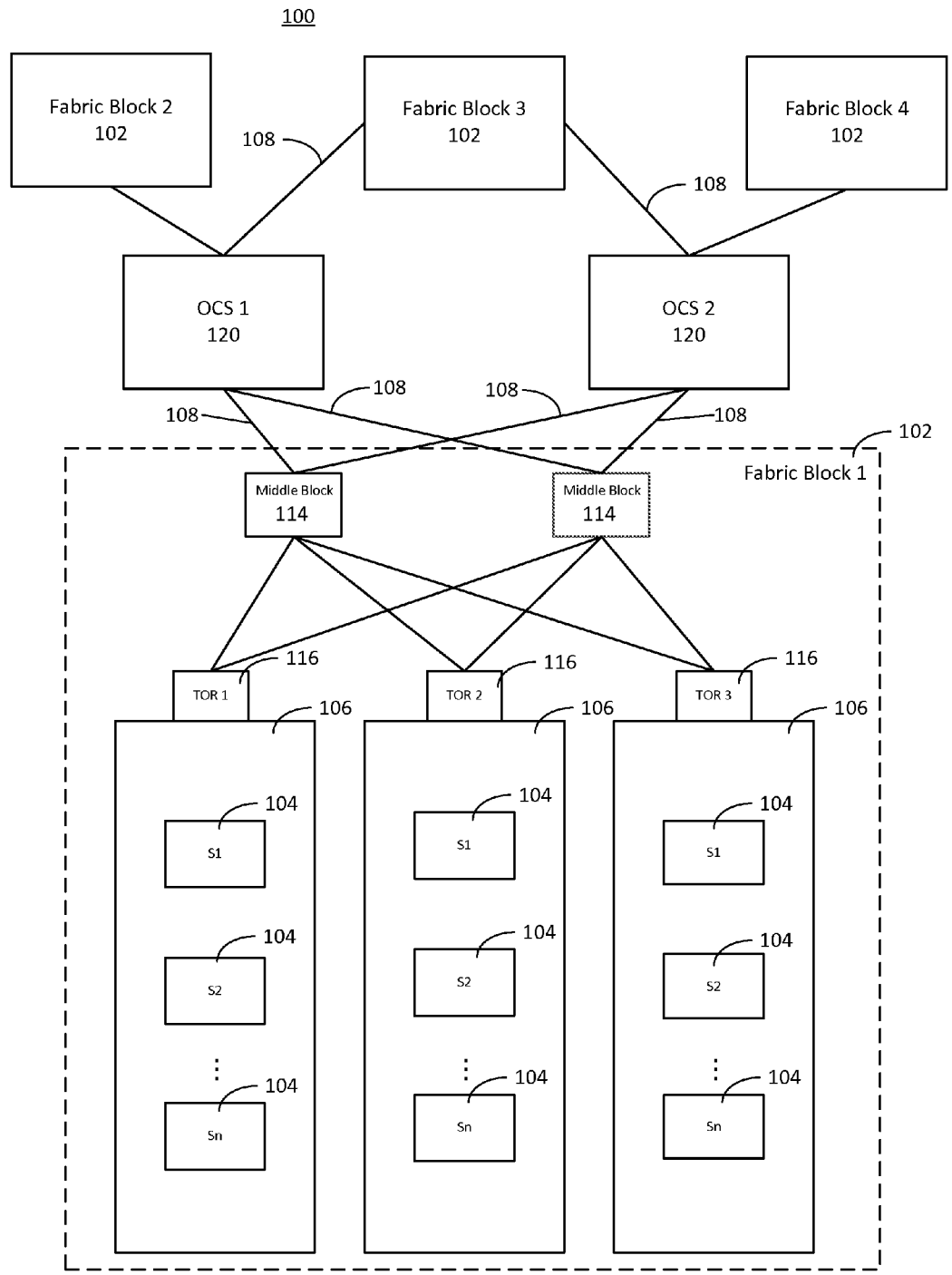
FIG. 1 is a block diagram of a datacenter, according to an illustrative implementation.

FIG. 1 is a block diagram of an datacenter 100, according to an illustrative implementation. The datacenter 100 includes several interconnected fabric blocks 102. Each fabric block 102 may include hundreds, and in some implementations over one thousand, servers 104 arranged in server racks 106. The fabric blocks 102 are communicatively coupled to one another by optical and/or electrical communication links 108. They can be connected directly, or through optical circuit switches (OCSs) 120, which serve as switches for routing data communications between the fabric blocks 102. The fabric blocks 102 include one or more middle blocks 114 for routing communications among the racks 106 included in the fabric block 102 and for routing data communications between the fabric block 102 to the OCSs 120. FIG. 1 shows a fabric block 102 having three server racks 106 and two middle blocks 114. However, in other implementations, a fabric block 102 may include any number of server racks 106 and middle blocks 114. For simplicity, each middle block 104 is shown as having a single connection to each OCS 102. However, in some implementations, each fabric block 102 may have any number of connections to a single OCS 120. In some implementations, the middle blocks 114 and server racks 106 of each fabric block 102 may not be physically contained within the same housing. Instead, each fabric block 102 can be logically defined as a group of all middle blocks 114 and server racks 106 that are interconnected, regardless of their relative position or proximity to each other within the datacenter. In some implementations, each fabric block 102 includes an equal number of middle blocks 104.

This disclosure primarily relates to the case in which fabric blocks 102 are connected only through OCSs 120. For example, the datacenter 100 can be modeled as a computer network consisting of two switch stages: a first switch stage including fabric blocks 102, and a second switch stage including OCSs 120. Communication between fabric blocks 102 is facilitated by the OCSs 120, and there are no direct connections between any two switches in the same stage. Each OCS 120 can serve as a patch panel for routing communications between fabric blocks 102. In some implementations, an OCS 120 can be configured to connect any of its input ports to any of its output ports. Therefore, a given OCS 120 can be configured to send data received from any fabric block 102 to any other fabric block 102 that is connected to the OCS 120. For example, the first OCS 120 is coupled to Fabric Block 1, Fabric Block 2, and Fabric Block 3. Therefore, the first OCS 120 could route data received from Fabric Block 1 to either Fabric block 2 or Fabric Block 3. However, because OCS 1 is not coupled to Fabric Block 4, OCS 1 cannot route data received from Fabric Block 1 directly to Fabric Block 4. Instead, to route data from Fabric Block 1 to Fabric Block 4, the data could be transmitted first from Fabric Block 1 to Fabric block 3 via OCS 1, and then from Fabric Block 3 to Fabric Block 4 via OCS 2. Alternatively, data could be routed from Fabric Block 1 to OCS 2, which could send the data directly to Fabric Block 4.

As indicated above, each fabric block 102 includes a large number of servers 104. The servers 104 are arranged in server racks 106. A top-of-rack switch 116 routes data communications between servers 104 within a given rack 106 and from servers within the rack to servers in other fabric blocks 102 or to computing devices outside the datacenter 100 via the middle blocks 114.

Generally, it can be desirable to increase throughput between the fabric blocks 102 of the datacenter 100. To increase reliability, it can also be desirable to increase the diversity of interconnections between the middle blocks 114 of each fabric block 102. In some implementations, these goals can be achieved by simply connecting each middle block 114 to each OCS 120. However, the long range fiber optic cables that form the communication links between middle blocks 114 and OCSs 120 can be very costly, making this approach prohibitively expensive in some datacenter environments. Furthermore, in some datacenters, the number of available ports on each middle block 114 and OCS 120 may not be sufficient to permit communication links to be formed from every middle block 114 to every OCS 120. Therefore, to reduce cost and complexity, it can be desirable to configure a datacenter, such as the datacenter 100, to deliver high throughput among fabric blocks 102 and high diversity among middle blocks 114 without having to connect each middle block 114 to each OCS 120. An example static interconnectivity scheme is disclosed herein which achieves these goals. The importance of diversity among middle blocks 114 of separate fabric blocks 102 is further illustrated below in connection with FIGS. 2A-2B.

Figure 2A:
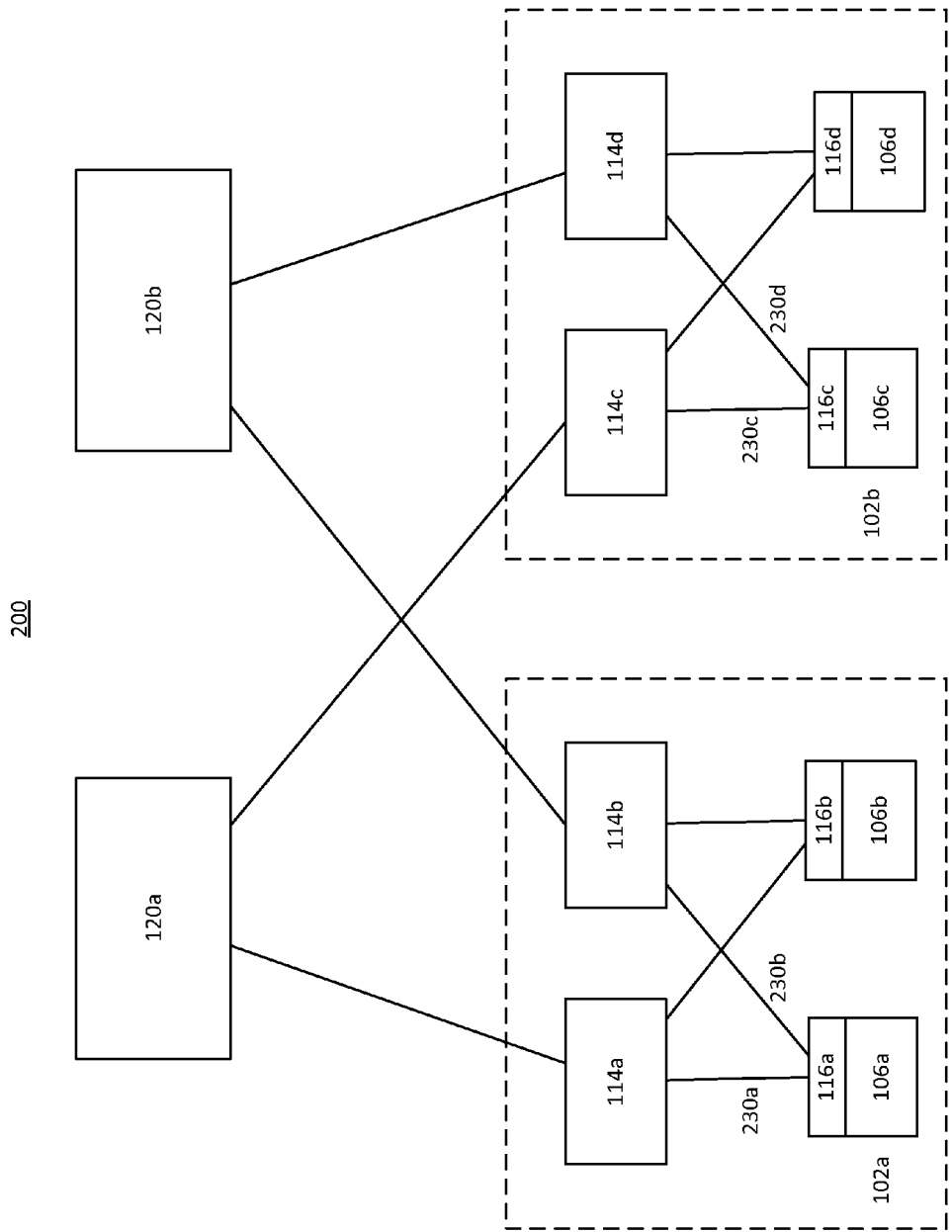
FIG. 2A is a block diagram of a network having no diversity of connections between middle blocks contained within different fabric blocks, according to an illustrative implementation.

FIG. 2A is a block diagram of a network 200 having no diversity of connections between middle blocks contained within different fabric blocks, according to an illustrative implementation. The network 200 includes two fabric blocks 102a and 102b (generally referred to as fabric blocks 102). The fabric block 102a includes two server racks 106a and 106b (generally referred to as server racks 106) coupled to two TOR switches 116a and 116b (generally referred to as TOR switches 116). TOR switches 116a and 116b are each connected to the middle blocks 114a and 114b. The fabric block 102b includes two server racks 106c and 106d coupled to two TOR switches 116c and 116d. TOR switches 116c and 116d are each connected to the middle blocks 114c and 114d. The network 200 also includes two OCSs 120a and 120b (generally referred to as OCSs 120). The OCS 120a couples to middle block 114a of fabric block 102a and middle block 114c of fabric block 102b. The OCS 120b couples to middle block 114b of fabric block 102a and middle block 114d of fabric block 102b. Communication link 230a couples TOR switch 116a to middle block 114a. Communication link 230b couples TOR switch 116a to middle block 114b. Communication link 230c couples TOR switch 116c to middle block 114c. Communication link 230d couples TOR switch 116c to middle block 114d. Communication links 230a-230d are generally referred to below as links 230.

The network 120a exhibits no diversity of connections between the middle blocks 114 of separate fabric blocks 112. Diversity relates to the number of middle blocks in a first fabric block reachable by each middle block in a second fabric block. In the network 200, middle block 114a of fabric block 102a can only communicate with middle block 114c of fabric block 102b (via OCS 120a), and middle block 114b of fabric block 102a can only communicate with middle block 114d of fabric block 102b (via OCS 120a). Middle block 114a cannot communicate with middle block 114d, and middle block 114b cannot communicate middle block 114c. Assuming that the links 230 are perfectly reliable, the lack of diversity in the network 200 will not impact data throughput between the fabric blocks 102 or the reliability of the data communications between the fabric blocks 102. However, in the event that some of the links 230 fail or become overly congested, the lack of diversity can severely impact throughput between the fabric blocks 102. In some instances, a single failure in each of the fabric blocks 102 can result in zero throughput between the fabric blocks 102.

For example, link 230a of fabric block 102a and link 230d of fabric block 102b may fail simultaneously. While each fabric block 102 still includes functional links (e.g., links 230b and 230c) joining the respective TOR switch 116 to a middle block 114, no data can be transmitted from the servers in the server rack 106a in fabric block 102a to the servers in the server rack 106c in fabric block 102b. An attempt to send data from the TOR switch 116a to the TOR switch 116b via the middle block 114a will fail because of the failure of the link 230a. An attempt to send data from the TOR switch 116a to the TOR switch 116b via the middle block 114b will also fail because, in order to reach the TOR switch 116b, data must be routed through OCS 120b to middle block 114d. Middle block 114d will then be unable to send the data to the server rack 106b through the TOR switch 116b, because link 230d has failed. Therefore, no communication between the servers in the server rack 106a in fabric block 102a and the servers in the server rack 106b in fabric block 102b is possible as a result of the two unrelated failures.

Figure 2B:
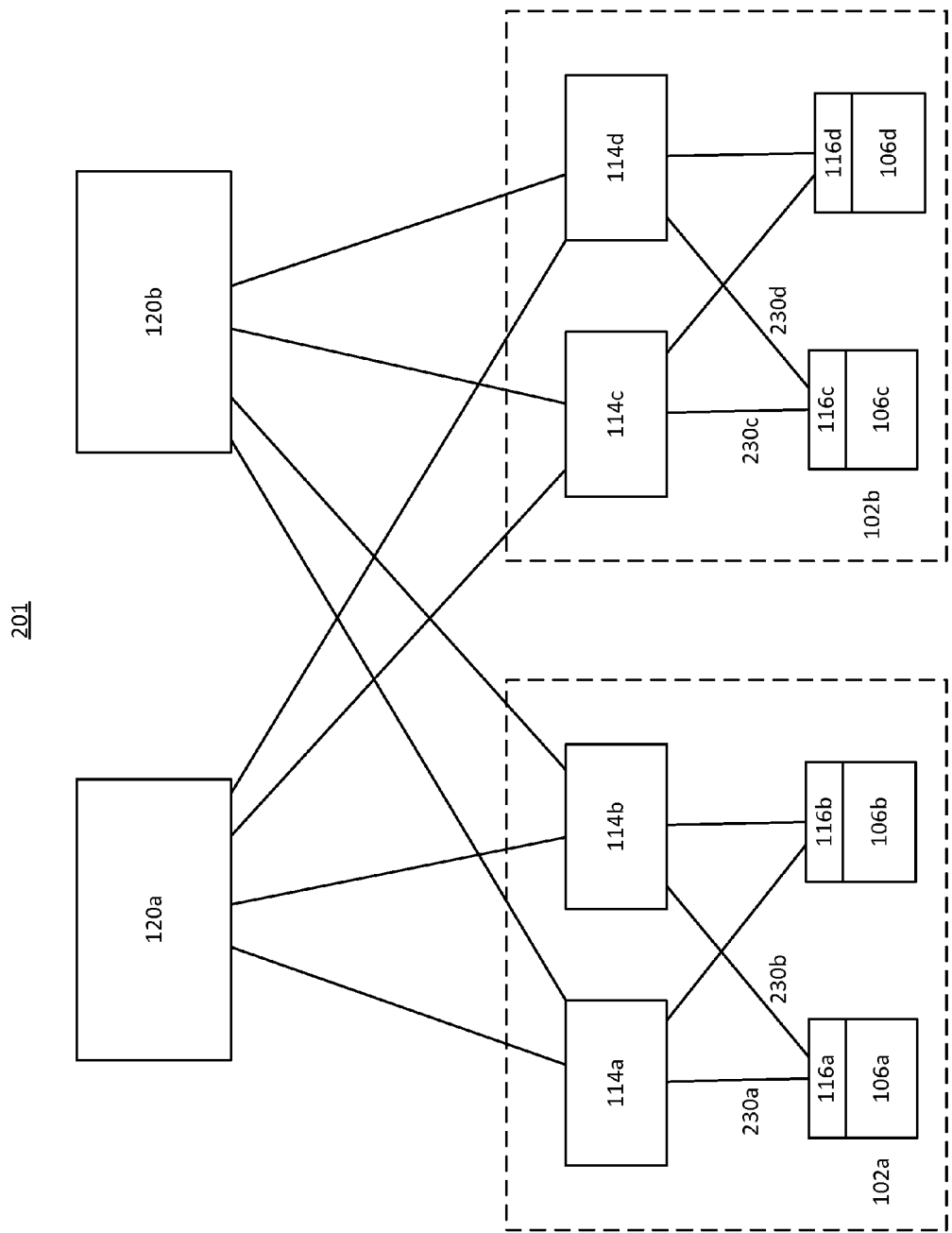
FIG. 2B is a block diagram of a network having diversity of connections between middle blocks contained within different fabric blocks, according to an illustrative implementation.

FIG. 2B is a block diagram of a network 201 having diversity of connections between middle blocks contained within different fabric blocks, according to an illustrative implementation. The network 201 includes two fabric blocks 102a and 102b (generally referred to as fabric blocks 102). The fabric block 102a includes two server racks 106a and 106b (generally referred to as server racks 106) coupled to two TOR switches 116a and 116b (generally referred to as TOR switches 116). TOR switches 116a and 116b are each connected to the middle blocks 114a and 114b. The fabric block 102b includes two server racks 106c and 106d coupled to two TOR switches 116c and 116d. TOR switches 116c and 116d are each connected to the middle blocks 114c and 114d. The network 200 also includes two OCSs 120a and 120b (generally referred to as OCSs 120). OCS 120a couples to every middle block 114 of both fabric blocks 102. Similarly, OCS 120b couples to every middle block 114 of both fabric blocks 102. Communication link 230a couples TOR switch 116a to middle block 114a. Communication link 230b couples TOR switch 116a to middle block 114b. Communication link 230c couples TOR switch 116c to middle block 114c. Communication link 230d couples TOR switch 116c to middle block 114d. Communication links 230a-230d are generally referred to below as links 230.

The network 120a exhibits diversity of connections between middle blocks 114 of separate fabric blocks 112, because each middle block 114 of the fabric block 112a has a path to each middle block 114 of the fabric block 102b. This contrasts with the arrangement of the network 200 shown in FIG. 2A, in which each middle block 114 is only coupled to a single middle block 114 of a separate fabric block 102. The diversity of the network 201 improves the reliability of communications between the server racks 106 of the fabric blocks 102. In the network 201, a single failure in each of the fabric blocks 102 will not result in zero throughput between server racks 106 of the fabric blocks 102.

For example, consider the same scenario in which link 230a of fabric block 102a and link 230d of fabric block 102b fail simultaneously. As demonstrated above, these failures could result in zero throughput between server racks 106a and 106c if there were no diversity. In the network 201, even with the failure of links 230a and 230d, while throughput between the server racks 106a and 106c may be decreased, communication is still possible. For example, to avoid the failed communication links 230a and 230d, data received form the server rack 106a can be sent from the TOR switch 116a to the middle block 114b via the functional link 230b. The middle block 114b can transmit the data to middle block 114c of the fabric block 102b via the OCS 120b. The middle block 114c can then transmit the data to the TOR switch 116c via the functional communication link 230c.

Therefore, as a result of the diversity of the network 201, the link failures do not prevent communication between servers 106 of the fabric block 102a and the fabric block 102b.

Figure 3A:
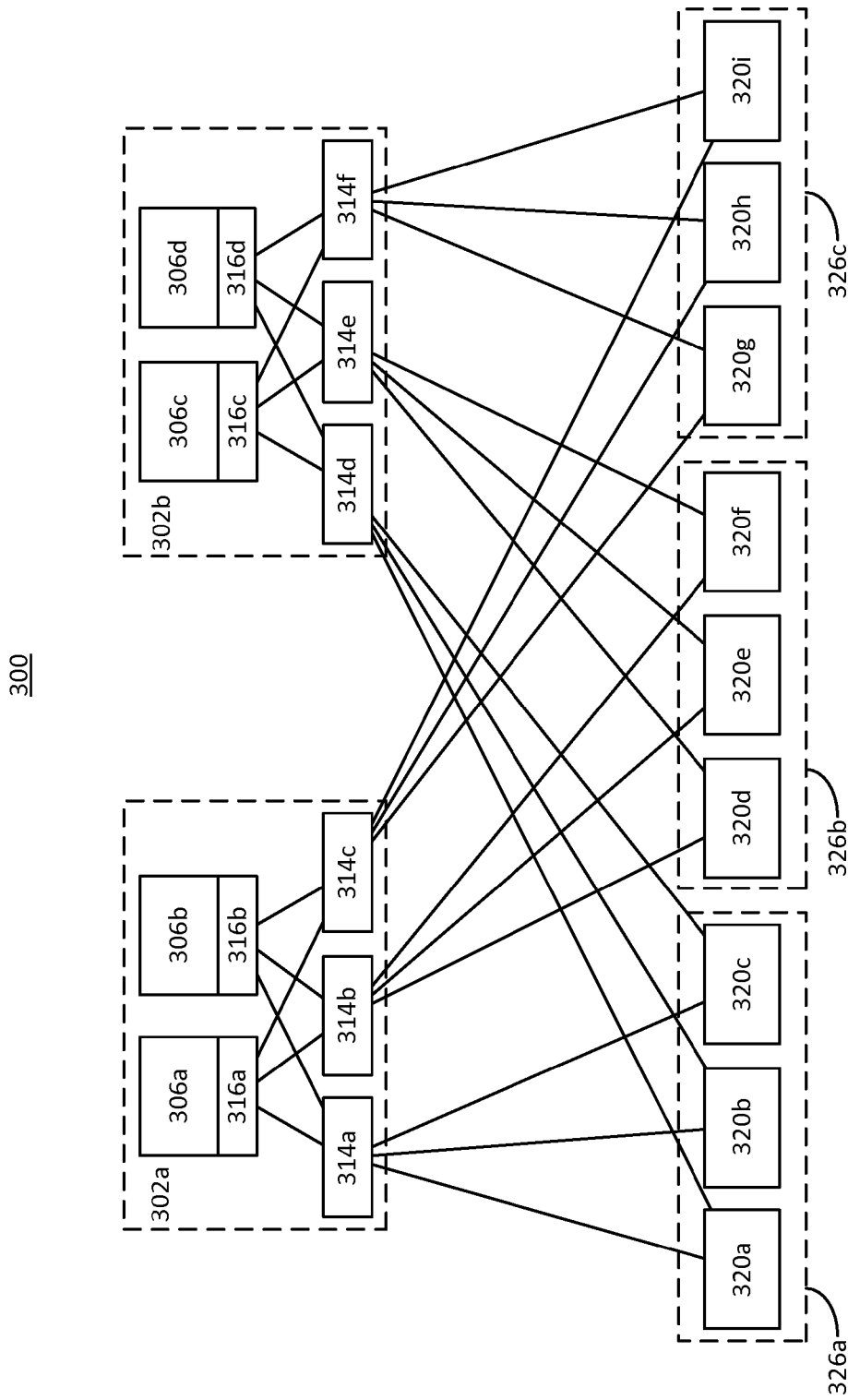
FIG. 3A is a block diagram of a network in which each fabric block employs the same cabling pattern to connect middle blocks to OCSs, according to an illustrative implementation.

FIG. 3A is a block diagram of a network 300 in which each fabric block employs the same cabling pattern to connect middle blocks to OCSs, according to an illustrative implementation. The network 300 includes two fabric blocks 302a and 302b (generally referred to as fabric blocks 302). Fabric block 302a includes two server racks 306a and 306b, and fabric block 302b includes two server racks 306c and 306d. The server racks 306a-306d are generally referred to as server racks 306. The server racks 306a and 306b couple to respective TOR switches 316a and 316b, and the server racks 306c and 306d couple to TOR switches 316c and 316d. The TOR switches 316a-316d are generally referred to as TOR switches 316. Middle blocks 314a-314c couple to the TOR switches 316a and 316b, and middle blocks 314d-314f couple to the TOR switches 316c and 316d. The network 300 also includes nine OCSs 320a-320i (generally referred to as OCSs 320). The OCSs 320 are divided into groups 326a-326c (generally referred to as OCS groups 326), with each OCS group 326 including three OCSs 320.

In some implementations, each OCS group 326 is a logical collections of contiguous, non-overlapping OCSs 320 (i.e., each OCS 320 belongs to a single group). The number of OCS groups 326 can be defined such that the number of OCSs 320 in each group 326 is equal to the number of middle blocks 314 in each fabric block 302. For example, in the network 300, each fabric block 302 includes three middle blocks 314. Therefore, each OCS group 326 is defined to include three OCSs 320. This grouping arrangement can facilitate the formation of communication links between middle blocks 314 and OCS 320 in the network 300. For each OCS group 326, a particular pattern of communication links can be used to connect the OCSs 320 to the middle blocks 314 of each fabric block 302. This can greatly simplify installation and maintenance of the network 300, particularly in instances in which the network 300 may have hundreds or thousands of fabric blocks 302 and OCSs 320.

In the network 300, the same cabling pattern is employed to couple the middle blocks 314 of every fabric block 302 to the OCSs 320 via communication links. As shown, for each fabric block 302, every middle block 314 included within a respective fabric block 302 is coupled to every OCS 320 of a single OCS group 326. For example, for fabric block 302a, the middle block 314a is coupled to the OCSs 320a-320c of OCS group 326a, the middle block 314b is coupled to the OCSs 320d-320f of OCS group 326b, and the middle block 314c is coupled to the OCSs 320g-320i of OCS group 326c. The same cabling pattern is used to couple the middle blocks 314d-314f of the fabric block 302b.

The cabling pattern shown in FIG. 3A permits communication between the server racks 306 of any two fabric blocks 302. This is due to the fact that each fabric block 302 includes at least one communication link to each OCS 320. Therefore, for any two fabric blocks 302, there is at least one communication path joining their respective middle blocks 314 through at least one OCS 320. However, the network 300 does not exhibit diversity of connections between middle blocks 314 of different fabric blocks 302.

Figure 3B:
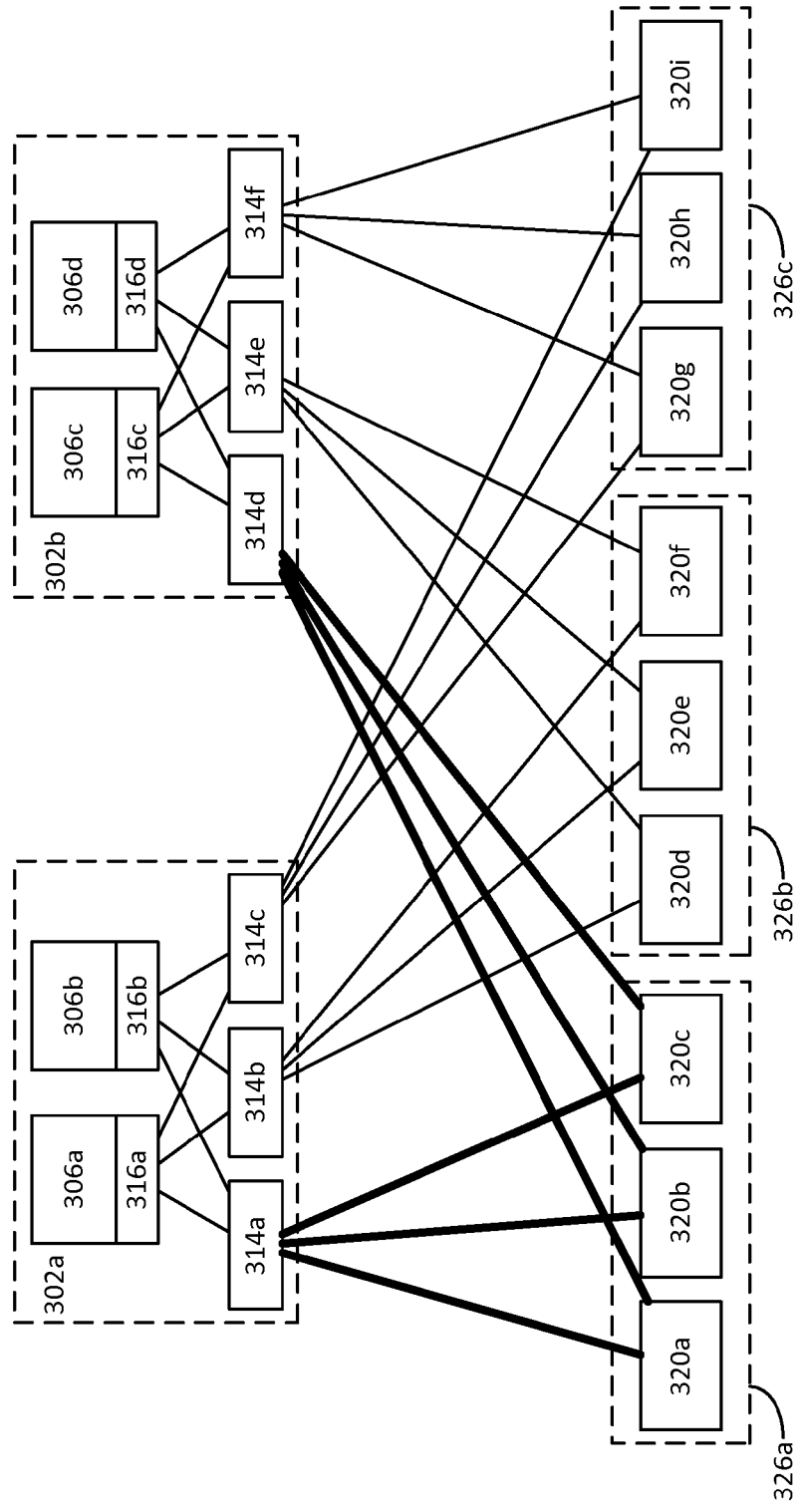
FIG. 3B illustrates the lack of diversity in the network shown in FIG. 3A.

FIG. 3B illustrates the lack of diversity in the network 300 shown in FIG. 3A. Diversity relates to the number of middle blocks 314 in a first fabric block 302 reachable by each middle block 314 in a second fabric block 302. The communication links joining middle block 314a of fabric block 302a to fabric block 302b are shown in bold. Although middle block 314a includes communication links to three separate OCSs (i.e., OCSs 320a-320c), middle block 314a couples only to the middle block 314d of fabric block 302b. As discussed above, networks exhibiting no inter-middle block diversity are less reliable than networks having diverse connections between the middle blocks 314 of each fabric block 302. For example, unrelated failures within fabric block 302a and fabric block 302b can result in a substantial decrease in throughput because each middle block 314a-314c in the fabric block 302a is able to reach only one middle block 314d-314f of the fabric block 302b. In some implementations, the network 300 may include additional fabric blocks and additional OCSs. However, if the additional fabric blocks and OCSs are coupled to one another according to the same arrangement, the network will still exhibit a lack of inter-middle block diversity. Therefore, in some implementations, it may be desirable to configure a network such as the network 300 with a different cabling patter to increase inter-middle block diversity. Such a method is discussed below in connection with FIG. 4.

Figure 4:
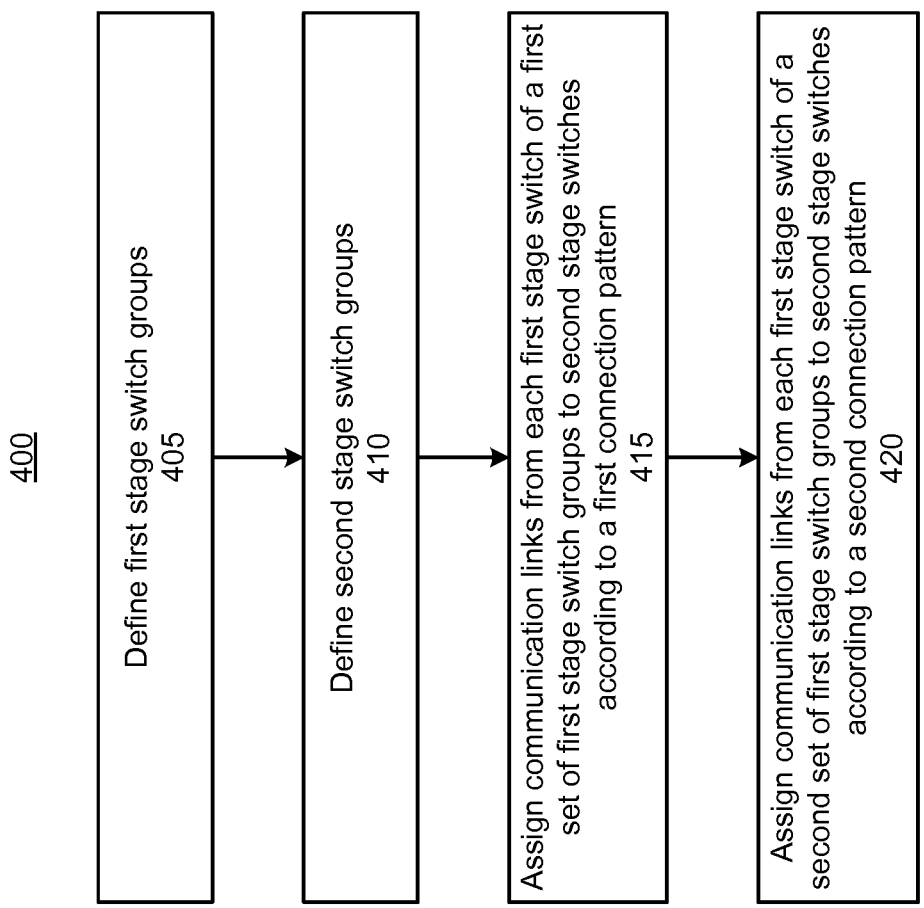
FIG. 4 is a flow diagram of a process for configuring a network, according to an illustrative implementation.
Figure 5A:
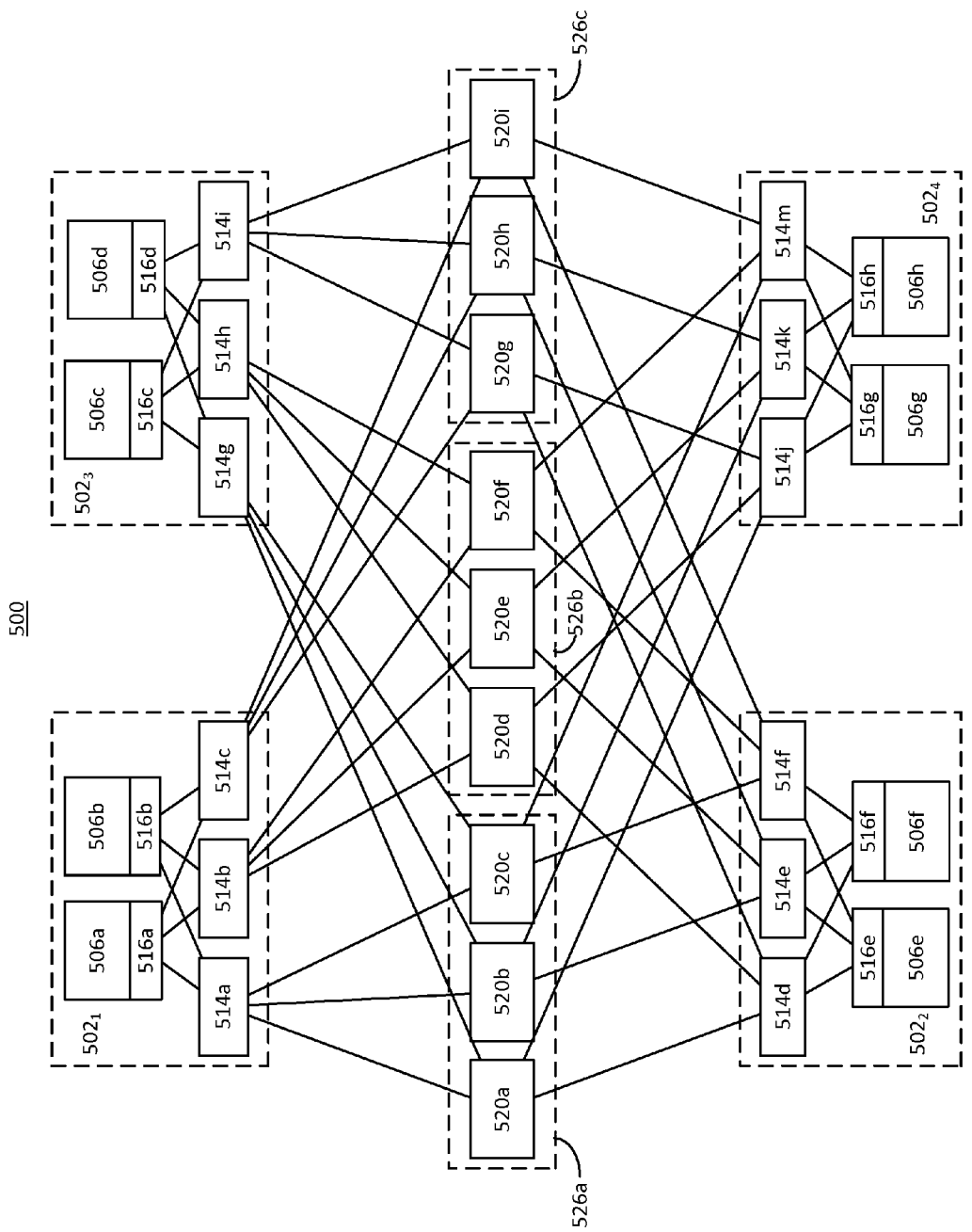
FIG. 5A is a block diagram of a network configured according to the process shown in FIG. 4, according to an illustrative implementation.

FIG. 4 is a flow diagram of a process 400 for configuring a network, according to an illustrative implementation. The process 400 can help to overcome the problems resulting from a lack of inter-middle block diversity. FIG. 5A is a block diagram of a network 500 configured according to the process 400 shown in FIG. 4, according to an illustrative implementation. The process 400 is discussed below with reference to the network 500. The process 400 includes defining first stage switch groups (stage 405), defining second stage switch groups (stage 410), assigning communication links from each first stage switch of a first set of first stage switch groups to second stage switches according to a first connection pattern (block 415), and assigning communication links from each first stage switch of a second set of first stage switch groups to second stage switches according to a second connection pattern (block 420).

The network 500 includes four fabric blocks $502_1$-$502_4$ (generally referred to as fabric blocks 502). Each fabric block 502 includes a respective pair of the server racks 506a and 506b, 506c and 506d, 506e and 506f, and 506g and 506h (generally referred to as server racks 506) coupled to a respective TOR switch 516a-516h (generally referred to as TOR switches 516). Middle blocks 514a-514c couple to the TOR switches 516a and 516b, middle blocks 514d-514f couple to the TOR switches 516c and 516d, middle blocks 514g-514i couple to the TOR switches 516e and 516f, and middle blocks 514j-514m couple to the TOR switches 516g and 516h. The network 300 also includes nine OCSs 520a-520i (generally referred to as OCSs 520). The OCS 520 are divided into groups 526a-526c (generally referred to as OCS groups 526), with each OCS group 526 including three OCSs 520.

Referring to FIGS. 4 and 5A, the process 400 includes defining first stage switch groups (stage 405). Each first stage switch group includes one or more first stage switches. In some implementations, the first stage switches are the middle blocks 514a-514m (generally referred to as middle blocks 514) of the network 500. Defining the first stage switch groups (stage 405) can therefore include assigning each middle block 514 to a respective fabric block, such as the fabric blocks $502_1$-$502_4$, as shown in the network 500. The first stage switches (i.e., the middle blocks 514) can be coupled to one or more TOR switches or server racks associated with their respective first stage switch group (i.e., the fabric blocks 502). For example, each fabric block 502 includes a respective pair of server racks 506 coupled to a respective TOR switch 516.

In some implementations, the first stage switch groups can each include an equal number of first stage switches. In some implementations, the number of first stage switches in each first stage switch group can be equal to the number of second stage switches divided by the number of outward facing network ports on each first stage switch. For example, in in the network 500, the second stage switches can be the OCSs 520a-520i (generally referred to as OCSs 520). Because there are nine OCSs 520 and each middle block 514 has three outward facing network ports, the middle blocks 514 are divided into groups (i.e., the fabric blocks 502) that each include three middle blocks 514. Such a configuration can reduce the number of communication links required to maintain the capability for any servers 506 of any two fabric blocks 502 to communicate with one another, thereby reducing cost and complexity.

The process 400 includes defining second stage switch groups (stage 410). Each second stage switch group includes one or more second stage switches. In some implementations, the second stage switches are the OCSs 520a-520i of the network 500. Defining the second stage switch groups (stage 410) can therefore include assigning each OCS 520 to an OCS group, such as the OCS groups 526a-526c (generally referred to as OCS groups 526), as shown in the network 500.

In some implementations, the first stage switch groups can further be grouped into sets. For example, in the network 500, the first stage switch groups (i.e., four fabric blocks 502) can further be grouped into sets. In some implementations the first stage switch groups may each be assigned an integer index number and may be divided into sets of first stage switch groups based on their index numbers. Each set of first stage switch groups can include an equal number of first stage switch groups. For example, each set of first stage switch groups in the network 500 can include two of the four fabric blocks. In the network 500, this can be achieved by assigning the fabric blocks 502 (i.e., first stage switch groups) to a set based on whether the fabric blocks 502 have been assigned an even or an odd index number. The odd-numbered fabric blocks (i.e., the fabric blocks $502_1$ and $502_3$) can be assigned to a first set, while the even-numbered fabric blocks (i.e., the fabric blocks $502_2$ and $502_4$) can be assigned to a second set. These sets are defined logically in the network 500 and are not represented visually in the block diagram of FIG. 5A.

The process 400 includes assigning communication links from each first stage switch of a first set of first stage switch groups to second stage switches according to a first connection pattern (block 415). A link can be assigned between a first stage switch and a second stage switch by communicatively coupling the switches, for example via a physical cable or wirelessly. For example, in the network 500, the first set of first stage switch groups includes the odd-numbered fabric blocks 502. In some implementations, for each first stage switch group of the first set of first stage switch groups, a communication link can be assigned between each first stage switch and each second stage switch in a respective second stage switch group. As shown, each middle block 514 (i.e., each first stage switch) in this set is coupled to each OCS 520 (i.e., each second stage switch) of a respective OCS group 526 (i.e., a respective second stage switch group). For example, the middle block 514a is coupled to each OCS 520 of the OCS group 526a, the middle block 514b is coupled to each OCS 520 of the OCS group 526b, and the middle block 514c is coupled to each OCS 520 of the OCS group 526c.

The process 400 further includes includes assigning communication links from each first stage switch of a second set of first stage switch groups to second stage switches according to a second connection pattern (block 420). For example, in the network 500, the second set of first stage switch groups includes the even-numbered fabric blocks 502 (i.e., fabric blocks $502_2$ and $502_4$). In some implementations, for each first stage switch group of the second set of first stage switch groups, a communication link can be assigned between each first stage switch and a single second stage switch in each second stage switch group. As shown, each middle block 514 (i.e., each first stage switch) in the second set of first stage switch groups is coupled to one OCS 520 (i.e., a single second stage switch) of each OCS group 526 (i.e., each second stage switch group). For example, the middle block 514d is coupled to OCS 520a of the OCS group 526a, OCS 520d of the OCS group 526b, and OCS 520g of the OCS group 520c.

Figure 5B:
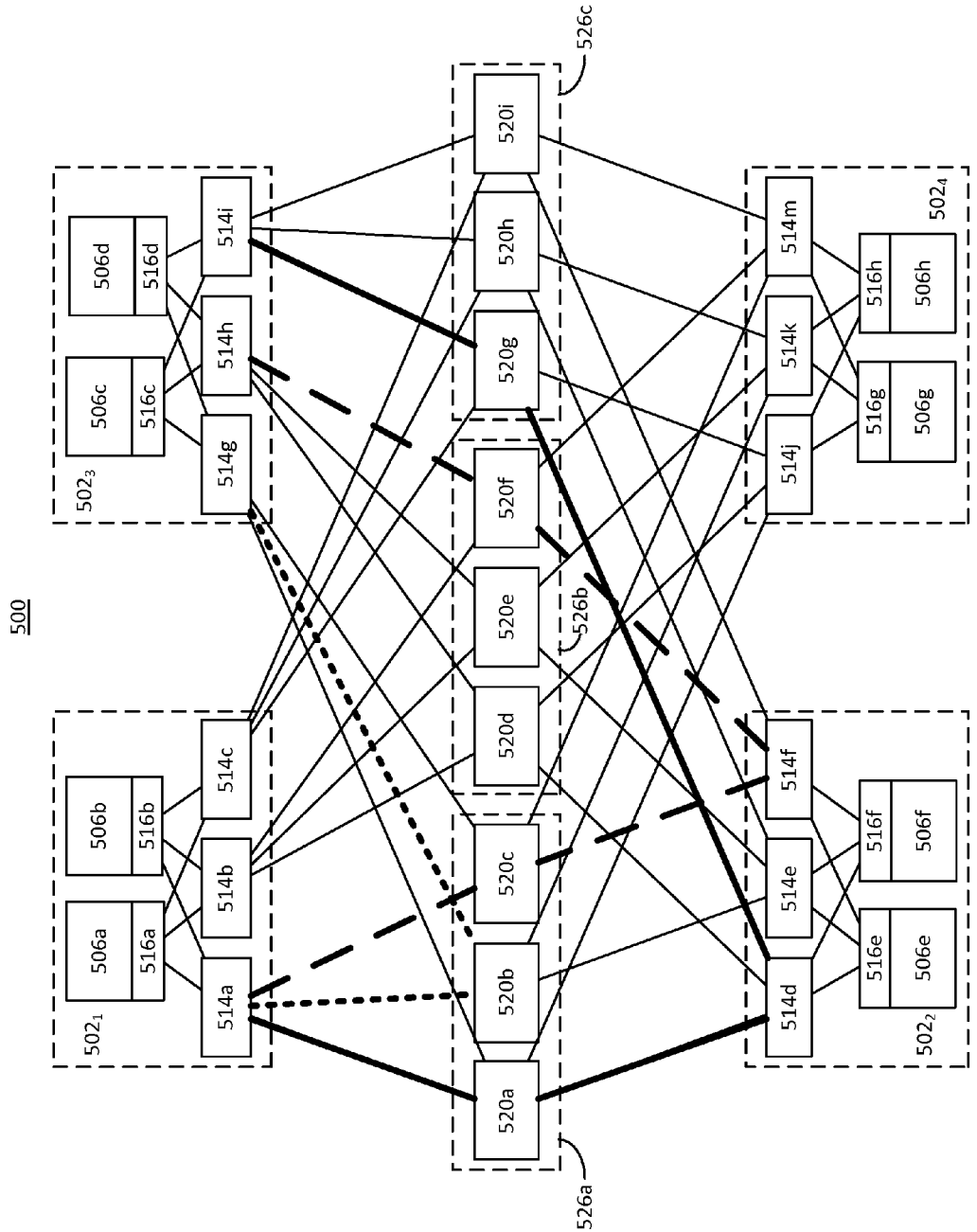
FIG. 5B illustrates the diversity of the network shown in FIG. 5A.

FIG. 5B illustrates the diversity of the network 500 shown in FIG. 5A. In the network 500, each middle block 514 in any fabric block 502 can communicate with each middle block 514 in every other fabric block 502. For example, the middle block 514a of the fabric block $502_1$ can reach every middle block 514 in fabric block $502_3$. Therefore, communications between the servers 506 can be achieved more reliably, because link failures within the fabric blocks 502 will have a less severe impact on throughput in the network 500 due to its diversity, as discussed above. Example communication link paths joining middle block 514a to each of middle blocks 514g-514i are shown in bold for illustrative purposes. Each bold path is shown in FIG. 5B using a unique line pattern to distinguish it from other paths. In addition to the highlighted paths, there may be other potential paths joining these middle blocks 514 that have not been highlighted.

Some of the paths may require routing data through the middle block 514 of a third fabric block 502. For example, the path from the middle block 514a to the middle block 514h passes through the OCS 520c, the middle block 514f of fabric block 502₂, and the OCS 520f. Similarly, the path from the middle block 514a to the middle block 514i passes through the OCS 520a, the middle block 514a of fabric block 502₂, and the OCS 520g. Other paths can be routed through a single OCS without passing through a middle block 514 of a third fabric block 502. For example, the path from the middle block 514a to the middle block 514g passes only through the OCS 520b.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single product or packaged into multiple products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method for configuring a datacenter network having a first stage of switches and a second stage of switches, the method comprising:
   defining first stage switch groups each comprising at least two first stage switches;
   defining second stage switch groups each comprising at least two second stage switches;
   for each first stage switch group of a first set of first stage switch groups:
      connecting each first stage switch in the first stage switch group to second stage switches in a different respective second stage switch group by assigning a communication link between each first stage switch in the first stage switch group and each second stage switch in its respective second stage switch group;
   for each first stage switch group of a second set of first stage switch groups:
      assigning a communication link between each first stage switch and only a single second stage switch of each second stage switch group.

2. The method of claim 1, wherein for each first stage switch group, each switch in the first stage switch group is coupled to a common top-of-rack switch.

3. The method of claim 1, wherein a number of first stage switch groups in the first set of first stage switch groups is equal to a number of first stage switch groups in the second set of first stage switch groups.

4. The method of claim 1, wherein defining first stage switch groups comprises assigning an equal number of first stage switches to each of the first stage switch groups.

5. The method of claim 1, further comprising:
   assigning a sequential integer index value to each of the first stage switch groups;
   assigning first stage switch groups having odd index values to the first set of first stage switch groups; and
   assigning first stage switch groups having even index values to the second set of first stage switch groups.

6. The method of claim 1, wherein each second stage switch is a configurable optical control switch used to form communication links between first stage switches.

7. The method of claim 6, further comprising disseminating the communication link assignments to the optical control switches.

8. The method of claim 6, further comprising defining a third stage of switches, each third stage switch coupled to at least one first stage switch.

9. The method of claim 8, wherein each third stage switch is a top-of-rack switch coupled to one or more servers.

10. A system having a first stage of switches and a second stage of switches, the system comprising:
    at least one first stage switch group each comprising at least two first stage switches; and
    at least one second stage switch group each comprising at least two second stage switches, wherein:
       for each first stage switch group of a first set of first stage switch groups, each first stage switch in the first stage switch group is connected to second stage switches in a different respective second stage switch group by a communication link is formed between each first stage switch in the first stage switch group and each second stage switch in its respective second stage switch group; and
       for each first stage switch group of a second set of first stage switch groups, a communication link is formed between each first stage switch and only a single second stage switch of each second stage switch group.

11. The system of claim 10, wherein for each first stage switch group, each switch in the first stage switch group is coupled to a common top-of-rack switch.

12. The system of claim 10, wherein a number of first stage switch groups in the first set of first stage switch groups is equal to a number of first stage switch groups in the second set of first stage switch groups.

13. The system of claim 10, wherein each first stage switch groups comprises an equal number of first stage switches.

14. The system of claim 10, wherein:
    each of the first stage switch groups is assigned a sequential integer index value;
    first stage switch groups having odd index values are assigned to the first set of first stage switch groups; and
    first stage switch groups having even index values are assigned to the second set of first stage switch groups.

15. The system of claim 10, wherein each second stage switch is a configurable optical control switch used to form communication links between first stage switches.

16. The system of claim 10, further comprising a third stage of switches, each third stage switch coupled to at least one first stage switch.

17. The system of claim 16, wherein each third stage switch is a top-of-rack switch coupled to one or more servers.

* * * * *